United States Patent
Garner, IV et al.

(10) Patent No.: US 12,148,029 B1
(45) Date of Patent: Nov. 19, 2024

(54) GEOLOCATION-BASED MESH AUTOMATIC LENDING NETWORK

(71) Applicant: Wells Fargo Bank, N.A., San Francisco, CA (US)

(72) Inventors: Andrew J. Garner, IV, State Road, NC (US); Chris Theodore Kalaboukis, San Jose, CA (US); Rameshchandra Bhaskar Ketharaju, Hydedrabad (IN); Joon Maeng, Newcastle, WA (US); Ramanathan Ramanathan, Bellevue, WA (US); Abhijit Rao, Irvine, CA (US); Andres J. Saenz, Redmond, WA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/106,648

(22) Filed: Feb. 7, 2023

Related U.S. Application Data

(62) Division of application No. 17/147,198, filed on Jan. 12, 2021, now Pat. No. 11,854,074.

(51) Int. Cl.
  *G06Q 40/03* (2023.01)
  *G06F 16/29* (2019.01)
  (Continued)

(52) U.S. Cl.
  CPC ............ *G06Q 40/03* (2023.01); *G06F 16/29* (2019.01); *G06N 20/00* (2019.01); *H04L 9/0643* (2013.01); *H04L 9/50* (2022.05)

(58) Field of Classification Search
  USPC ......................................................... 705/38
  See application file for complete search history.

(56) References Cited

U.S. PATENT DOCUMENTS

| | | |
|---|---|---|
| 4,633,397 A | 12/1986 | Macco |
| 7,555,459 B2 | 6/2009 | Dhar et al. |

(Continued)

FOREIGN PATENT DOCUMENTS

| | | |
|---|---|---|
| WO | WO-2018/155937 A1 | 8/2018 |

OTHER PUBLICATIONS

Chang et al., Exploring Blockchain Technology for Capital Markets: A Case of Angel Fund, Jul. 1, 2018, 2018 IEEE International Conference on Internet of Things and IEEE Green Computing and Communications and IEEE CPSCom and IEEE Smart Data, pp. 1941-1948. (Year: 2018).*

*Primary Examiner* — Scott C Anderson
*Assistant Examiner* — George N. Proios
(74) *Attorney, Agent, or Firm* — Foley & Lardner LLP

(57) ABSTRACT

A method includes using a distributed computing system to form a syndicate, generate a unique identifier for each of a plurality of participants of the syndicate, receive a verification request comprising the unique identifier from each of the plurality of participants, verify that a respective entity is a node on the distributed computing system, receive loan terms templates from each of the plurality of participants, receive a plurality of data from each of the plurality of participants, identify a first subset of participants having an excess of funds and a second subset of participants having a lack of funds, and verify each of the first subset of participants and the second subset of participants. The method includes using a syndicate computing system to automatically execute at least one loan agreement between at least one of the first subset of participants and at least one of the second subset of participants.

20 Claims, 8 Drawing Sheets

(51) Int. Cl.
    *G06N 20/00*     (2019.01)
    *H04L 9/00*     (2022.01)
    *H04L 9/06*     (2006.01)

(56) References Cited

U.S. PATENT DOCUMENTS

| | | | |
|---|---|---|---|
| 7,716,125 B2 * | 5/2010 | Shavit et al. | G06Q 40/00 705/38 |
| 7,805,382 B2 | 9/2010 | Rosen et al. | |
| 8,712,819 B2 | 4/2014 | Brief et al. | |
| 9,727,912 B1 | 8/2017 | Poursartip et al. | |
| 9,786,005 B1 | 10/2017 | Poursartip et al. | |
| 10,060,802 B1 | 8/2018 | Ragosta et al. | |
| 10,529,017 B1 * | 1/2020 | Gianakopoulos | G06Q 40/025 10/67 |
| 2004/0267606 A1 | 12/2004 | Brishke et al. | |
| 2005/0044038 A1 * | 2/2005 | Whiting et al. | 705/39 |
| 2008/0294546 A1 | 11/2008 | Flannery | |
| 2009/0228307 A1 | 9/2009 | Sorbe | |
| 2010/0049662 A1 | 2/2010 | Price et al. | |
| 2010/0131390 A1 | 5/2010 | Emswiler | |
| 2014/0244479 A1 * | 8/2014 | White et al. | G06Q 40/025 705/38 |
| 2015/0248646 A1 | 9/2015 | Avats | |
| 2017/0024813 A1 * | 1/2017 | Crouspeyre et al. | G06Q 40/02 40/25 |
| 2017/0053091 A1 | 2/2017 | Holmes et al. | |
| 2017/0169508 A1 | 6/2017 | Song et al. | |
| 2017/0300861 A9 | 10/2017 | Avats | |
| 2018/0247023 A1 | 8/2018 | Divine et al. | |
| 2018/0349986 A1 | 12/2018 | Fidanza et al. | |
| 2018/0374582 A1 | 12/2018 | Holmes et al. | |
| 2020/0098461 A1 | 3/2020 | Macoviak et al. | |
| 2020/0118164 A1 | 4/2020 | Defrank et al. | |
| 2020/0302315 A1 | 9/2020 | Golding | |

\* cited by examiner

GEOLOCATION-BASED MESH AUTOMATIC LENDING NETWORK

CROSS-REFERENCE TO RELATED APPLICATIONS

This application is a divisional of U.S. patent application Ser. No. 17/147,198, filed Jan. 12, 2021, which is incorporated herein by reference in its entirety.

FIELD

The systems and methods described herein relate generally to the field of distributed ledger technology (DLT). More specifically, the systems and methods described herein relate to geolocation-based mesh automatic syndicate-based lending networks. In some embodiments, the syndicate-based lending networks are structured to use DLT.

BACKGROUND

Businesses are generally asked to provide information in connection with receiving or offering a loan. Oftentimes, businesses are asked to provide financial information to qualify for receiving a loan. That is, when a business requires additional funds to maintain operation, the business first provides proof of credit-worthiness to prospective lenders. The business may also be required to provide a plan (e.g., a business plan) for how the business will utilize the funds form the loan agreement. However, having to provide such information is time-consuming, inefficient, and sometimes computing resources-intensive. Businesses that operate on cyclical schedules (e.g., seasonal resorts) may require quick periodic loans to maintain operation during off-season times. Additionally, businesses that are impacted by disasters (e.g., natural disasters, epidemics) may require immediate relief to offset unforeseen expenditures related to the disaster.

SUMMARY

At least one embodiment relates to a distributed computing system for facilitating automatic loan agreements between a plurality of syndicate participants. The distributed computing system includes a network and a blockchain including a plurality of blockchain services. The plurality of blockchain services includes a membership service, an oracle service, a smart contracts service, a predictive analytics service, and a loan service. The membership service is configured to register the plurality of syndicate participants to the syndicate. Registering the plurality of syndicate participants includes generating a unique identifier for each of the plurality of syndicate participants. The membership service is also configured to, in response to receiving a verification request comprising the unique identifier, verify that a respective entity is a node on the blockchain, the node corresponding to one of the plurality of syndicate participants. The oracle service is configured to retrievably store loan terms templates provided by the plurality of syndicate participants. The smart contracts service is configured to receive a plurality of data. The plurality of data includes at least one of financial data associated with the plurality of syndicate participants, macroeconomic data, geo-location data, disaster data, and public health data. The predictive analytics service is configured to utilize machine learning techniques and at least one of the plurality of data to determine whether a first syndicate participant of the plurality of syndicate participants has an excess of funds and whether a second syndicate participant of the plurality of syndicate participants, different from the first syndicate participant, has a lack of funds. The loan service is configured, in response to the determination, to automatically facilitate a loan agreement between the first syndicate participant and the second syndicate participant, wherein the loan agreement is based on one or more of the plurality of data and a loan template.

Another embodiment relates to a method of facilitating automatic loan agreements. The method includes forming, by a distributed computing system, a syndicate. The syndicate includes a plurality of participants. The method includes generating, by the distributed computing system, a unique identifier for each of the plurality of participant, receiving a verification request including the unique identifier from each of the plurality of participants and verifying that a respective entity is a node on the distributed computing system, the node corresponding to one of the plurality of participants. The method also includes receiving, by the distributed computing system, loan terms templates from each of the plurality of participants and retrievably storing, by an oracle service associated with the distributed computing system, the loan terms templates. The method further includes receiving, by the distributed computing system, a plurality of data from each of the plurality of participants, the data comprising one or more of economic data and geo-location data. The method also includes identifying, by the distributed computing system and based on the plurality of data, a first subset of participants of the plurality of participants, the first subset of participants having an excess of funds, and a second subset of participants of the plurality of participants, the second subset of participants having a lack of funds. The method further includes verifying, by the distributed computing system, each of the first subset of participants and the second subset of participants. The method also includes automatically executing, by the syndicate computing system and responsive to the identification, at least one loan agreement between at least one of the first subset of participants and at least one of the second subset of participants.

Another embodiment relates to a non-transitory computer-readable storage media having instructions stored thereon that, when executed by at least one processing circuit, cause the at least one processing circuit to perform operations to execute an automatic loan agreement between participants of a syndicate. The operations include causing the processing circuit to register a plurality of syndicate participants to a syndicate. The operations further include causing the processing circuit to generate a unique identifier for each of the plurality of syndicate participants. The operations further include causing the processing circuit to receive financial data associated with the plurality of syndicate participants. The operations further include causing the processing circuit to receive geo-location data associated with the plurality of syndicate participants. The operations further include causing the processing circuit to receive loan terms templates from each of the plurality of syndicate participants. The operations further include causing the processing circuit to retrievably store the loan terms templates. The operations further include causing the processing circuit to identify a first subset of syndicate participants of the plurality of the syndicate participants, the first subset of the syndicate participants having an excess of funds, and a second subset of the syndicate participants of the plurality of the syndicate participants, the second subset of the syndicate participants having a lack of funds. The operations further include causing the processing circuit to generate, responsive to the identification, a loan agreement between one or more of the first subset of the plurality of syndicate participants and one or more of the second subset of the plurality of syndicate participants, based on one or more of the financial data and the geo-location data. The operations further include causing the processing circuit to execute the loan agreement comprising transferring funds from the one or more of the first subset of the plurality of syndicate participants to the one or more of the second subset of the plurality of syndicate participants.

This summary is illustrative only and is not intended to be in any way limiting.

BRIEF DESCRIPTION OF THE FIGURES

The systems and methods will become more fully understood from the following detailed description, taken in conjunction with the accompanying figures, wherein like reference numerals refer to like elements, in which.

Figure 1:
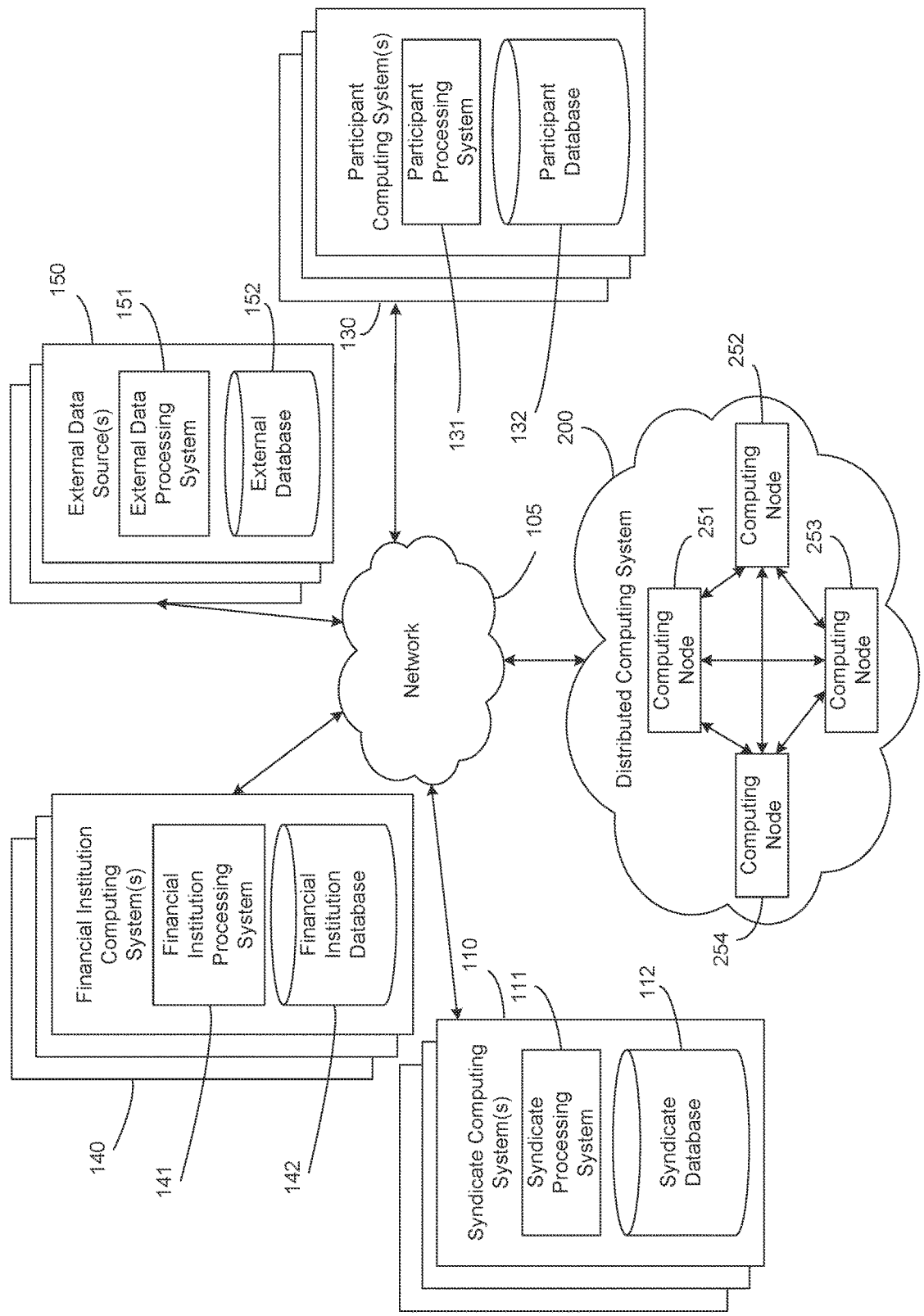
FIG. 1 is a block diagram depicting a system for providing automatic loan agreements within a mesh network, according to some arrangements.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Before turning to the figures, which illustrate certain embodiments in detail, it should be understood that the systems and methods described herein are not limited to the details or methodology set forth in the description or illustrated in the figures. It should also be understood that the terminology used herein is for the purpose of description only and should not be regarded as limiting.

Referring generally to the figures, the systems and methods described herein are generally directed to providing automatic loan agreements between members (e.g., participants) of a syndicate. In some embodiments, members of a syndicate are individuals. In some embodiments, members of a syndicate are businesses (e.g., small businesses that provide automatic loans to one another as needed.) In some embodiments, the loan agreements are executed on and recorded by a distributed computing system. According to various embodiments, at least some members of a syndicate can be syndicate providers, defined herein as individuals or entities that supply, manage, and/or operate the computing systems described herein. In some embodiments, a syndicate provider is a financial institution (e.g., a bank and/or a credit union). The distributed computing system may utilize blockchain technology to retrievably store data (e.g., immutable data, data capable of being audited) associated with the syndicate participants, the syndicate providers, and/or the loan agreements. In some embodiments, the distributed computing system may utilize geolocation data, financial data, and disaster-related data to determine terms of loan agreements. Additionally, the distributed computing system may utilize various techniques, such as predictive analytics, machine learning techniques, etc. to process the geolocation data, financial data, disaster related data, etc., and to generate a computer-based prediction relating to when a participant of the syndicate needs additional funds from a loan or is able to provide funds for a loan.

Accordingly, in some embodiments, the systems and methods described herein are directed to loan agreements between two or more syndicate participants. The loan agreement may include various parameters such as amount, duration, interest rate, etc. In some embodiments, the systems and methods may provide for a "funding transaction" between two or more syndicate participants. A "funding transaction" (also known as "financial aid transaction", "assistance", and/or "assistance transaction") is defined as a gift, discount, loan, reward, etc. given by one participant to another participant. Various arrangements described herein enable a business to opt into a service (e.g., register for membership of a syndicate). After registering for membership, the business becomes a participant of the syndicate, through which the business may receive relief (e.g., loans) from other syndicate participants in the event that the business is impacted by cyclical or disaster related financial shortages. The system includes a distributed computing system platform through which businesses can set up automatic funding or loan agreements. For example, the system may provide various predicted expenses based on previous cyclical financial data or previous disasters that impacted businesses performance. Once the expenses are predicted or otherwise determined, the system determines if the participants have enough funds set aside to afford the various expenses to be incurred via electronic or digital transactions. Such determinations may be made automatically based on participant financial information stored in a syndicate computing system. If it is determined that a first participant is unable to afford the expenses and a second participant has excess funds, the system can automatically execute a loan agreement between the first participant and the second participant based on the templates of the first participant and the second participant generated using the relevant oracle(s). Accordingly, the system can access the financial institution(s) associated with the first participant and the second participant and facilitate the transfer of funds from the second participant to the first participant. The system may also provide a notification associated with the loan agreement to the first participant and the second participant.

The ability to automatically receive funds based on an automatic loan agreement, such as automatically receiving funds periodically or during a disaster, provides businesses with enhanced ability to continue normal operations without having to manually provide financial information to prospective lenders. Accordingly, the systems and method described herein provide automatic loan agreements between two or more syndicate participants based on geolocation data, financial data, and disaster related data. The systems and methods also provide for registering businesses to the syndicate as a syndicate participant. In some arrangements, systems and methods may include providing loan agreement template(s) to the syndicate participants. In some arrangements, the loan agreement templates can include DLT-based smart contracts. The loan agreement template(s) may define loan agreement parameters such as amount, duration, interest rate, etc. In some embodiments, a first loan agreement template defines loan parameters for providing a loan and a second loan agreement template defines loan parameters for receiving a loan. In other embodiments, the loan agreement parameters may be defined by the syndicate participants individually. In other embodiments, the loan agreement template is automatically defined by the system utilizing the geolocation data, financial data, and disaster related data. Advantageously, according to various embodiments, the templates can be generated based on DLT-based oracles. As used herein, the term "oracle" refers to retrievably stored (e.g., in non-transitory memory) executable code that includes a callable reference to at least one smart contract executable. In various embodiments, an oracle can be structured as an intermediary layer between external data sources (e.g., sources of data related to participant identity information, participant financial information, loan terms, loan pricing, geolocation, and disaster related data) and smart contract executables that generate loan agreements using the provided data. Accordingly, oracles provide a technical advantage of verifying and/or authenticating external data sources as well as querying external data resources, which preserves network bandwidth by eliminating the need for smart contract executables to perform these operations. Further, this architecture minimizes the number of changes required to smart contracts as external data sources and their authentication requirements change. Further, using oracles as an intermediary layer presents a technical improvement in data provenance verification, as counterparty smart contracts are prevented from each independently querying the data sources and being vulnerable to manipulation (e.g., via code injection) of data sources to set terms more favorable to a particular party than is warranted by the external data.

Advantageously, in some embodiments, the arrangements described herein implement automatic, anonymous loan agreements between participants of a syndicate. Herein, "automatic" is defined as pertaining to an electronically carried out action that does not require outside (either human or machine) intervention to be scheduled, triggered, executed, and/or completed. "Anonymous" (e.g., "private", "anonymized") is defined as access-controlled or secured (with respect to digitized information about the participants of a syndicate and/or about their electronic devices) such that (a) the identities of the participants are not revealed to anyone outside the syndicate; and/or (b) the participants requesting funding, providing funding, or both can remain anonymous to other participants, including the syndicate providers to funding/financial aid transactions. Traditional, non-digitized loan creation processes cannot provide such automation and anonymity while also maintaining data integrity via the oracle(s).

Advantageously, the arrangements described herein improve computer-related technology by automating certain steps that cannot be performed by human actors in loan agreements between syndicate participants without significant effort and time spent. For example, the system may utilize predicative analytics (e.g., artificial intelligence (AI), etc.) to analyze historical financial transactions to identify spending pattern(s) of syndicate participants and use the spending pattern(s) to predict, in an accurate, realistic and timely manner, a need for loan. In some arrangements, the system is structured to evaluate the financial position of the participant (such as spending history, account balance, credit score, syndicate participation history, and the like) to determine risk information for the customer. In some arrangements, the system receives external data to facilitate predicting a need for a loan. That is, the system may utilize the identified spending pattern(s) in conjunction with external data (e.g., geo-location data, seasonal/cyclical data, disaster related data, etc.) to predicted the need for a loan. In some arrangements, information about the loan agreements is presented to the customer through a user interface of a mobile user device, such as a smartphone.

FIG. 1 is a block diagram depicting a system 100 for providing automatic loan agreements within a mesh network, according to some arrangements. In particular, the system 100 is configured to facilitate automatic anonymous loan agreements between participants of a syndicate. As shown, the system 100 includes syndicate computing system(s) 110, participant computing system(s) 130, financial institution computing system(s) 140, external data source(s) 150, and a distributed computing system 200 communicatively coupled to each other via a network 105. In some embodiments, the system 100 may include fewer or additional computing systems.

According to various example embodiment, the syndicate computing system(s) 110 are configured to retrievably store, send, and receive data associated with the syndicate (e.g., participant financial data, loan agreements, external data, etc.). The syndicate computing system 110 may also be configured to facilitate interactions between syndicate participants. In some embodiments, the syndicate computing system 110 is associated with a syndicate provider. In these arrangements the syndicate provider may include and/or manage financial accounts for one or more participants of the syndicate. In some arrangements, syndicate provider may include one or more financial institution, insurance provider, or other business not participating in the syndicate. In some embodiments, when the syndicate provider includes one or more financial institutions, the syndicate computing system(s) 110 and the financial institution computing system(s) 140 may be the same computing systems.

As shown, the syndicate computing system 110 includes a processing system (e.g., syndicate processing system 111) and a database (e.g., syndicate database 112). As defined herein, the term "system" may refer to an arrangement that includes a processor, non-transitory memory and circuitry structured to cause the processor to perform various operations. The syndicate processing system 111 is configured to receive data associated with the syndicate via the network 105 and provide data associated with the syndicate from the syndicate computing system 110 to any of the other systems and devices on the network 105. The syndicate database 112 is configured to retrievably store the data associated with the syndicate.

According to various example embodiments, the participant computing system(s) 130 are configured to retrievably store, send, and receive data associated with the syndicate participants. In these embodiments, syndicate participants may be associated with one or more of the participant computing system(s) 130. For example, the participant computing system 130 may be associated with a multiple participants and is configured to retrievably store, send, and receive data associated with the each participant. As shown, the participant computing system(s) 130 include a processing system (e.g., participant processing system 131) and a database (e.g., participant database 132). The participant processing system 131 is configured to receive data associated with the syndicate and/or other syndicate participants via the network 105 and provide data associated with a syndicate participant from the participant computing system 130 to any of the other systems and devices on the network 105. The participant database 132 is configured to retrievably store the data associated with the syndicate participant, such as identification information, geographical location, banking provider information, account information, and/or participant computing system device (node) identifier (IP address, subnet, domain, subdomain, MAC address, unique cryptographically generated address hyperlink included that constitutes a unique DLT node identifier, etc.).

According to various example embodiments, the financial institution computing system(s) 140 are configured to retrievably store, send, and receive financial data associated with the syndicate participants. Additionally, the financial institution computing system(s) 140 may be configured to facilitate and/or process financial transactions (e.g., funds transfer, credit transactions, loan payments, etc.). In these embodiments, each of the syndicate participants may be associated with one or more of the financial institution computing system(s) 140. For example, a first participant may be associated with a first financial institution such that the first participant can access a financial data associated with the first participant from a first financial institution computing system via the network 105. As shown, the financial institution computing system(s) 140 include a processing system (e.g., financial institution processing system 141) and a database (e.g., financial institution database 142). The financial institution processing system 141 is configured to receive financial data associated with the syndicate and/or syndicate participants via the network 105 and provide financial data associated with the syndicate participants from the financial institution computing system 140 to any of the other systems and devices on the network 105. The financial institution database 142 is configured to retrievably store the financial data associated with the syndicate participants. The financial data may be cross-referenced to other data sources (e.g., the participant database 132) via a suitable identifier, such as participant identification information and/or participant computing system device (node) identifier.

According to various example embodiments, the external data source(s) 150 are configured to retrievably store, send, and receive external data. Additionally, the external data source(s) 150 may be configured to record, analyze and/or report the external data. In some embodiments, the external data is associated with one or more of the syndicate participants. The external data may include geo-location related data, cyclical/seasonal data, disaster related data, etc. For example, the external data sources may record, analyze, and/or report on a disaster (e.g., natural disaster, anthropogenic hazard, disease outbreak, etc.) that occurred near a physical location of a syndicate participant (e.g., a brick and mortar store of a business participating in the syndicate). As shown, the external data source(s) 150 include a processing system (e.g., external data processing system 151) and a database (e.g., external database 152). The external data processing system 151 is configured to record, analyze and/or report the external data. The external data processing system 151 may receive data associated with the syndicate participants via the network 105. The external data processing system 151 may also provide external data from the external data source(s) 150 to any of the other systems and devices on the network 105. The external database 152 is configured to retrievably store the external data.

The system 100 is also shown to include a distributed computing system 200. In some embodiments, the distributed computing system 200 is a blockchain (DLT) computing system. Accordingly, the distributed computing system 200 may include a plurality of nodes (e.g., computing nodes 251, 252, 253, and 254) that are interconnected with one another to form a peer-to-peer network. Each of the computing nodes (e.g., computing nodes 251, 252, 253, and 254) on the distributed computing system 200 includes hardware elements and one or more processors (e.g., any general purpose or special purpose processor), operably coupled to one or more transitory and/or non-transitory storage mediums and/or memory devices (e.g., any computer-readable storage media, such as a magnetic storage, optical storage, flash storage, RAM, etc.). That is, the nodes may be configured to operate as processing systems and/or storage devices that are part of the distributed computing system 200.

According to various example embodiments, the distributed computing system 200 and computing nodes 251, 252, 253, and 254 are configured to send, receive, and store data associated with the syndicate. That is, the distributed computing system 200 and nodes thereof are configured to receive data associated with the syndicate and/or syndicate participants via the network 105 and provide data associated with the syndicate and/or syndicate participants from the distributed computing system 200 to any of the other systems and devices on the network 105. In some embodiments, the distributed computing system 200 also includes additional functions such as executing smart contracts, preforming predictive analysis (e.g., statistical analytics, machine learning, artificial intelligence, etc.), storing financial records, etc. Accordingly, in various embodiments, the syndicate computing system(s) 110 and participant computing system(s) 130 may, at least in part, be structured as particular nodes on the distributed computing system 200. In some arrangements, the processing circuitry (e.g., the syndicate processing system 111, the participant processing system 131) may be included and/or executable by the particular nodes, and the data storage media (e.g., the syndicate database 112, the participant database 132) may be stand-alone singular or distributed entities communicatively coupled to the respective nodes.

Still referring to FIG. 1, the syndicate computing system(s) 110 is configured facilitate loan agreements between participants of the syndicate. According to various example embodiments, the loan agreements are executed automatically and anonymously such that each of the participants party to the loan agreement (e.g., the lenders and the borrowers), and the facilitators (e.g., providers/managers of the syndicate) are each unaware of the counterparty to a particular loan transaction. Accordingly, the loan agreement information that cross-references to each counterparty can be retrievably stored in the syndicate database 112. The syndicate computing system(s) 110 are configured to receive participant data from the participant computing system(s) 130, financial data from the financial institution computing system(s) 140, and external data from the external data source(s) 150. The participant data, the financial data, and the external data are each associated with the syndicate participant profiles in the syndicate database 112, the profiles being capable of being cross-referenced to the participant database 132 and/or the financial institution database 142 based on participant identification information and/or participant computing system device (node) identifier. The syndicate computing system 110 are also configured to determine, based on the participant data, the financial data, and the external data, if one or more of the syndicate participants require additional funds and/or if one or more of the syndicate participants has excess funds. Based on the determination, the syndicate computing system 110 can assign the participants into at least a first group and a second group. The first group includes participants that require additional fund and the second group includes participants that have excess funds. In some embodiments, the syndicate computing system(s) 110 may also create a third group that includes participants that do not need additional fund and do not have excess funds. The syndicate computing system(s) 110 may also continuously or periodically update the groups based on updated participant data, financial data, and/or external data. That is, the syndicate computing system 110 may reassign participants to a different group as needed.

The syndicate computing system(s) 110 are also configured to facilitate a loan agreement between one or more participants in the first group (e.g., a borrower) and one or more participants in the second group (e.g., a lender). The loan agreement may be based on one or more of the participant data, the financial data, and the external data. In some embodiments, the syndicate computing system(s) 110 may determine, based on one or more of the participant data, the financial data, and the external data, various parameters of a loan agreement such as an amount, a duration, an interest rate, etc. For example, the syndicate computing system(s) 110 may identify a first participant in the first group (e.g., a borrower) that requires a first amount of funds and a second participant in the second group (e.g., a lender) that has excess funds of a leas the first amount. The syndicate computing system(s) 110 may define various loan parameters based on a maximum/minimum loan duration, interest rate, etc. set by the first participant and a maximum/minimum duration, interested rate, etc. set by the second participant. In other embodiments, the syndicate computing system(s) 110 may identify one or more participants from the first group (e.g., borrowers) and one or more participants form the second group (e.g., lenders) to be party to the loan agreement. That is, the loan agreement may include one or more borrowers and one or more lenders. For example, one lender may fund loans for multiple borrowers simultaneously and one borrower may receive loaned funds from multiple lenders.

In some embodiments, when a single member is a lender in the loan agreement, the syndicate may act as an underwriter to the loan agreement. The syndicate computing system(s) 110 may be configured to retrievably store an underwriter template that defines an amount of risk the syndicate is willing to take on as the underwriter. The syndicate computing system(s) may determine, based on the riskiness of the loan and the underwriter template, whether the syndicate should act as the underwriter for the loan agreement. The amount of risk may be determined by the syndicate computing system(s) 110 in real time and based on the participant data, the financial data, and/or the external data. For example, the amount of risk may be determined based on the participant data including an indication of how much risk each participant is willing to take.

In some embodiments, when more than one member is a lender, a third party may act as an underwriter for the loan agreement. For example, the third party may include a service provider, a financial institution, and the like.

Figure 2:
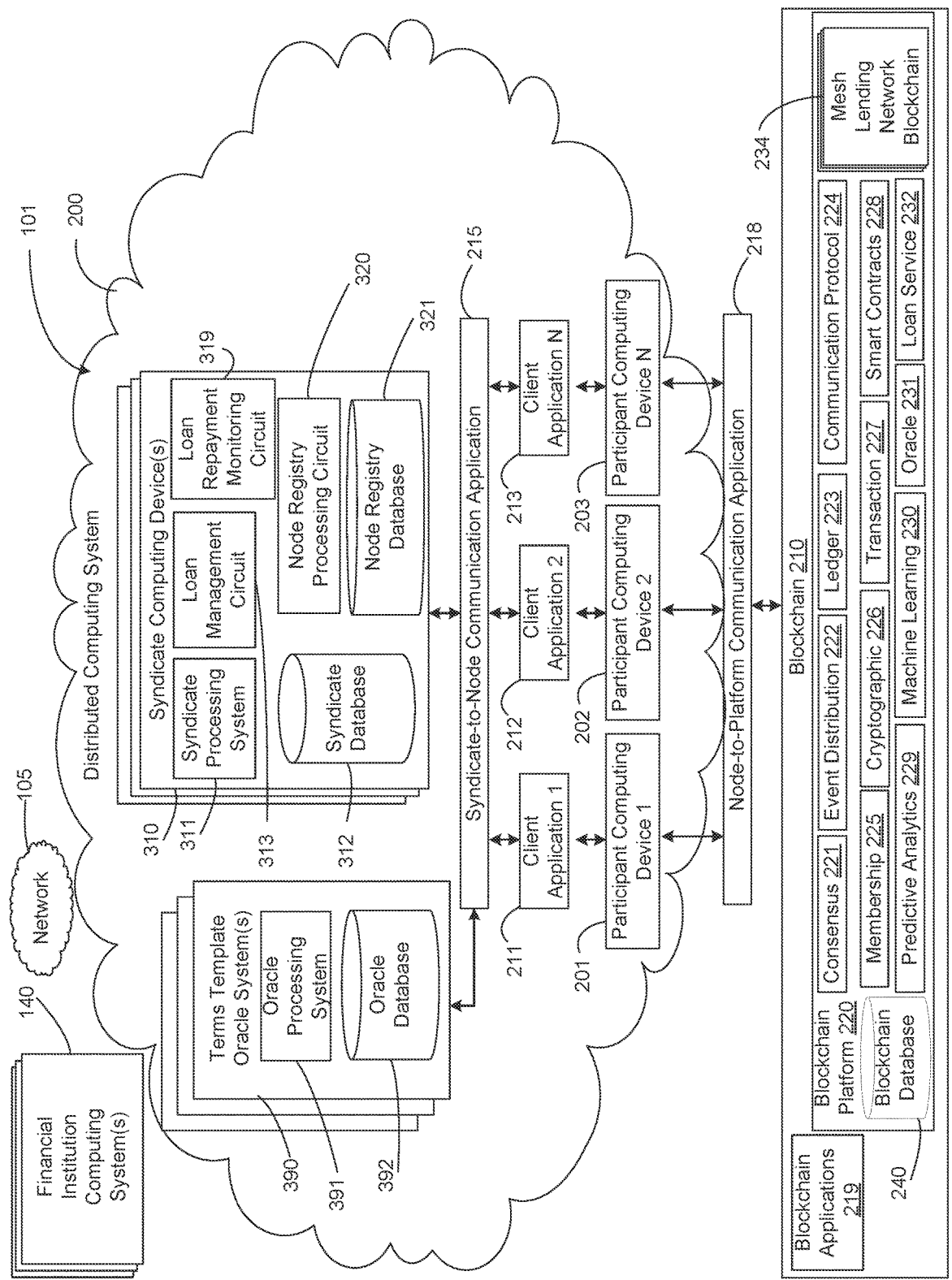
FIG. 2 is a block diagram depicting another view of the system for providing automatic loan agreements within a distributed computing system, according to some arrangements.

FIG. 2 is a block diagram depicting another view of the system 100 for providing automatic loan agreements within a distributed computing system, according to some arrangements. Here, the system is shown as having a blockchain (DLT)-based infrastructure. As shown, the system includes a distributed computing system 200. In some embodiments, the distributed computing system 200 is connected to the network 105 such that the distributed computing system 200 is communicatively coupled to the financial institution computing system(s) 140 via the network 105. The distributed computing system 200 includes one or more syndicate computing devices 310 (e.g., the syndicate computing systems 110 of FIG. 1), participant computing devices (e.g., participant computing devices 201, 202, 203), client applications (e.g., client applications 211, 212, 213), a syndicate-to-node communication application 215, and one or more terms template oracle systems 390. Additionally, the distributed computing system 200 is configured to provide a blockchain-based infrastructure (e.g., blockchain 210) and a node-to-platform communication application 218 for the participant computing devices 201, 202, 203. The blockchain 210 includes blockchain applications 219, which collectively comprise the blockchain platform 220. The blockchain platform 220 includes various capabilities/services including a consensus service 221, an event distribution service 222, a ledger service 223, a communication protocol service 224, a membership service 225, a cryptographic service 226, a transaction service 227, a smart contracts service 228, a predictive analytics service 229, a machine learning service 230, an oracle service 231, and a loan service 232. The blockchain platform also includes a mesh lending network blockchain 234 and a blockchain platform database 240. In some arrangements, the blockchain platform database 240 is an entity separate from and communicatively coupled to the blockchain 210 and can include any of the database entities described with respect to the system of FIG. 1. As defined herein, the term "service" refers to circuitry coupled to a memory and at least one processor. The circuitry that has computer-executable code retrievably stored thereon that, when executed by the processor, causes a computing system to perform various operations encapsulated by a particular service (e.g., an oracle service 231 may be structured to perform oracle-related operations).

According to various example embodiments, the financial institution computing system(s) 140, as described above, are configured to execute financial transactions. The financial institution computing system(s) 140 can be accessed by the distributed computing system 200, and nodes thereof, via the network 105.

The one or more syndicate computing devices 310 may be configured as a computing node (e.g., computing nodes 251, 252, 253, and 254 in FIG. 1) of the distributed computing system 200. In some embodiments, the syndicate computing devices 310 may be configured to manage other nodes of the distributed computing system 200 and provide applications to various users of the distributed computing system 200. As shown, the one or more syndicate computing devices 310 include a syndicate processing system 311, a syndicate database 312, a loan management circuit 313, a loan repayment monitoring circuit 319, a node registry processing circuit 320, and a node registry database 321.

The syndicate processing system 311 is configured to receive data associated with the syndicate via the network 105 or from other devices and systems in the distributed computing system 200. The syndicate processing system 311 is also configured to provide data associated with the syndicate from the syndicate computing system 310 to any of the other systems and devices on the network 105 or that are part of the distributed computing system 200. The syndicate database 312 is configured to retrievably store the data associated with the syndicate. The syndicate processing system 311 and the syndicate database 312 are the same or substantially similar to the syndicate processing system 311 and the syndicate database 312 to the in FIG. 1 and described above.

The loan management circuit 313 is configured to define loan agreement parameters based on loan templates. The loan management circuit 313 is also configured to execute loan agreements by sending a request to the financial institution computing system(s) 140 to initiate a funds transfer. The loan management circuit 313 may also be configured to be part of the syndicate processing system 311. The loan management circuit 313 is also configured to update the syndicate database 312 and/or the blockchain platform database 240 with data associated with the loan agreements.

The loan repayment monitoring circuit 319 is configured to monitor the repayment of a loan. For example, a loan agreement between a lender and a borrower may define a loan amount, a term or duration, an interest rate, a monthly payment, etc. The loan repayment monitoring circuit 319 is configured to receive financial data from the financial institution computing system(s) 140 and determine if the borrower is making timely monthly payments. The loan repayment monitoring circuit 319 is also configured to update the syndicate database 312 and/or the blockchain platform database 240 with data associated with the repayment of loans.

The node registry circuit 320 is configured to receive data associated with the syndicate participants and the participant computing devices 201, 202, and/or 203. The data can include participant identification information and/or participant computing system device (node) identifier, which can be retrievably stored in the node registry database 321 when a new participant node is registered to the blockchain. In some embodiments, registering a new node includes generating a unique identifier for the blockchain. Generating the unique identifier can include a hyperlink comprising a unique node address, which uniquely identifies the node to the blockchain. The hyperlink and/or address can be generated based on concatenating any of the device identifying information (IP address, MAC address, etc.) and/or participant identifying information.

The node registry circuit 320 is also configured to provide data associated with the syndicate participants and the participant computing devices 201, 202, and/or 203 from the node registry database 321 to any of the other systems and devices on the network 105 or on the distributed computing system 200. Specifically, the node registry circuit 320 is configured to verify that the syndicate participants and the participant computing device 201, 202, 203 are registered with the syndicate. For example, the syndicate processing system 311 may identify a need for a loan agreement and cause the loan management circuit 313 to define loan agreement parameters and execute the loan agreement. The node registry processing circuit 320 may simultaneously verify that all parties of the loan agreement are registered participants of the syndicate (e.g., by receiving a verification request comprising a participant identifier, device identifier, and/or client application instance identifier, parsing the identifier from the request message, and cross-referencing the identifier to the node registry database 321 to determine whether a particular node is registered.) Accordingly, the node registry database 321 is configured to retrievably store data indicating which business and participant computing devices (e.g., participant computing device 201, 202, 203) are registered with the syndicate.

According to various example embodiments, the participant computing devices 201, 202, and/or 203 are the same or substantially to the participant computing system(s) 130. The participant computing devices 201, 202, and/or 203 can access an individualized client application (e.g., client applications 211, 212, 213). The client applications 211, 212, 213 are configured to facilitate communication between the participant computing devices 201, 202, and/or 203 and the syndicate-to-node communications application 215. That is, a first participant computing device 201 can execute or access a first client application 211, a second participant computing device 202 can execute or access a second client application 212, and an Nth participant computing device 203 can execute or access an Nth client application 213. The client applications 211, 212, 213 may be configured to cause the participant computing devices 201, 202, 203 to generate a graphical user interface on a display. For example, the client applications 211, 212, 213 may cause the participant computing devices 201, 202, 203 display data associated with the syndicate such that the data is viewable by a syndicate participant user from the participant's device. Additionally, the client applications 211, 212, 213 may be configured to receive data from the participant computing devices 201, 202, 203. The data can be input manually by a user or automatically retrieved (e.g., by a screen scraping process).

The syndicate-to-node communications application 215 is configured to be accessed by the syndicate computing device (s) 310 such that the syndicate computing device(s) 310 can send and receive data to/from the participant computing devices 201, 202, 203 via the client applications 211, 212, 213 and the syndicate-to-node communications application 215. In some embodiments, the system includes a terms template oracle system 390, as discussed further herein. The participant computing devices 201, 202, 203, as part of initial registration and/or when loan terms change, can enter and transmit terms-related data via the client applications 211, 212, 213, communicatively coupled to the syndicate computing device(s) 310 using the syndicate-to-node communications application 215. Accordingly, direct communication between the participant computing devices 201, 202, 203 is not enabled, such that the terms template oracle system 390 is protected from terms manipulation, code injection attacks, etc. by rogue individual nodes. Accordingly, the terms template oracle system 390 is managed centrally by the syndicate computing device(s) 310.

As discussed above, the syndicate computing device(s) 310 are also communicatively coupled to the terms template oracle system(s) 390. According to various example embodiments, the terms template oracle system(s) 390 are configured to retrievably store, send, and receive data associated with loan agreement templates. The loan agreement templates (i.e. terms templates) include information that defines minimum and/or maximum values for various loan parameters. For example, a loan agreement template can include information about a maximum and/or a minimum value for a loan amount, interest rate, monthly payment, etc. According to an example embodiment, each of the syndicate participants causes, via the client applications 211, 212, 213, the syndicate computing device(s) 310 to create at least two templates on behalf of the participant (e.g., participant's preferred terms for receiving a loan and a different set of preferred terms for providing a loan). A first template defines loan parameters when the participant is a lender, and a second template defines loan parameters when the participant is a borrower. In some arrangements, the client applications 211, 212, 213 may cause the participant computing devices 201, 202, 203 display a graphical user interface and take input form a user to define the parameters of the first template and the second template. In some embodiments, the terms template oracle system 390 can receive an electronic message comprising the terms data and may cause the syndicate computing device(s) 310 to verify that the submitter is a valid registered participant. In some embodiments, to minimize network bandwidth by eliminating this additional request-response cycle, the verification can be completed by the syndicate computing device(s) 310 prior to transmitting the terms data to the terms template oracle system 390.

As shown, the terms template oracle system(s) 390 includes a processing system (e.g., oracle processing system 391) and a database (e.g., oracle database 392). The oracle processing system 391 is configured to receive templates from the participant computing devices 201, 202, 203 via the client applications 211, 212, 213, the syndicate-to-node communication application, and the syndicate computing device(s). Additionally the oracle processing system 391 is configured to provide the templates from the terms template oracle system(s) 390 to the syndicate computing device(s) such that the syndicate processing system 311 and/or the loan management circuit 313 can utilize the information within the templates to create a loan agreement. The oracle database 392 is configured to retrievably store data containing the templates and information thereof.

The node-to-platform communication application 218 is configured to facilitate communication between nodes of the distributed computing system 200 and the various services provided by the blockchain 210. In some embodiments, the node-to-platform communication application 218 can also facilitate communication between other nodes of the distributed computing system 200. When a particular blockchain 210 service is invoked by the respective node, the client application 211, 212, or 213 can generate an electronic request message transmitted via node-to-platform communication application 218. The message can include originator information (e.g., participant identifier, device identifier, client application instance identifier). Based on any of this information parsed from the message, the blockchain 210 can cause the syndicate computing device 310 to verify that the originator is registered before performing the requested service.

The blockchain 210 includes blockchain applications 219 and a blockchain platform 220 having a plurality of services. The blockchain applications 219 present capabilities of the blockchain platform to participants and/or providers of the syndicate. In particular, the blockchain applications 219 may include the client applications 211, 212, 213, the syndicate-to-node communication application 215, and/or the node-to-platform application 218. In some embodiments, the blockchain applications 219 may include other applications such as a template creation application, a loan agreement application, or other application related to the function of the system 100. The blockchain applications 219 may be configured as web applications, smart-device apps, etc.

The blockchain platform 220 includes (or is communicatively coupled to) a blockchain platform database 240 configured, for example, to retrievably store transaction data associated with data transactions, financial transactions, and other transaction data associated with the syndicate. The blockchain platform 220 also includes a mesh lending network blockchain 234. The mesh lending network blockchain 234 is configured to record participant registration events, loan agreement creation events, loan repayment transaction events, participant membership status change events etc. In some embodiments, the mesh lending network blockchain 234 is a separate blockchain configured to record various events associated with the syndicate.

The consensus service 221 enables a consensus process used by the nodes of the distributed computing system 200 to agree on the validity and order of data transactions, financial transactions, etc. that are recorded by the blockchain platform database 240 and/or the mesh lending network blockchain 234. The consensus service maintains a consistently replicated ledger within the distributed computing system 200. For example, a copy of the ledger can be stored at each of the nodes of the distributed computing system 200.

The event distribution service 222 is configured to identify significant changes that occur within the distributed computing system 200. Additionally, the event distribution service 222 is configured to generate notifications of the changes to the distributed computing system 200 and selectively provide the notifications to each of the nodes of the distributed computing system 200.

The ledger service 223 includes a sequence of cryptographically linked blocks of the blockchain that contain a record of transactions (e.g., data transactions, financial transactions, etc.).

The communication protocol service 224 facilitates communication between nodes of the distributed computing system 200. In some embodiments, the communication protocol service 224 provides one or more of the blockchain applications 219 (e.g., the client applications 211, 212, 213, the syndicate-to-node communication application 215, the node-to-platform communication application, etc.). In other embodiments, the communication protocol service 224 provides a node-to-node communication application configured to communicatively couple nodes of the distributed computing system 200 to each other.

The membership service 225 is configured to manage identity, privacy, anonymity, and auditability within the distributed computing system 200. Accordingly, the membership service 225 allows only participants/members of the syndicate to submit transactions or validate the network. In some embodiments, the membership service 225 is configured to assign a permission level to teach of the syndicate members. For example, participants may not be able to know the identity of other participants, but non-participant members (e.g., providers) may selectively identify other members. In some arrangements, members may be given elevated permissions based on a transaction event. For example, a non-participating member (e.g., a provider) may receive permissions to view the identity of a second participate that received the loan (e.g., a borrower) if the second participant failed to make one or more monthly payments. This information may be transmitted, via the node-to-platform communication application 218, to the syndicate computing device (310), retrievably stored by the syndicate computing device(s) 310 in the node registry database 321, and used as part of the node verification process by syndicate computing device(s) 310.

The cryptographic service 226 is configured the blockchain 210 with access to cryptographic algorithms (e.g., hash functions, digital signatures, etc.). The cryptographic service 226 is also configured to ensure that the data stored in the blockchain 210 is immutable.

The transaction service 227 creates records that are appended to the ledger service 223. The transaction service 227 can create records of transactions (e.g., data transactions, financial transactions, etc.).

The smart contracts service 228 is configured to provide the distributed computing system with smart contracts (e.g., automatically generated virtual contracts/agreements) As used herein, the phrase "smart contract" generally refers to a self-executing code (e.g., in a distributed ledger network or other system) that executes when a set of conditions that have been agreed upon by the parties of the smart contract are met. Although the figures and specification generally discuss utilizing smart contracts on loan agreements, the systems, methods, and apparatuses disclosed herein can also be used for a plurality of and types of financial services, such as but not limited to transactions, deeds, leases, wills, non-smart contracts, traditional legal contracts, and other types of agreements between multiple parties. That is, parties to the smart contract or other types of agreements may be individuals, companies, organizations, and so on. In some embodiments, the smart contracts service 228 is configured to determine which transactions as stored by the ledger service 224. Additionally, the smart contracts service 228 may be configured to determine the type of data stored by the ledger service 224. In some embodiments, the smart contracts service 228 is structured to receive a new loan request comprising a first participant identifier and a second participant identifier and to generate and/or invoke one or more executables associated with a particular smart contract, the one or more executables stored in blockchain database 240. The one or more executables can be populated with loan terms according to templates received from the terms template oracle system 390. The relevant template(s) can be identified by querying the oracle database 392 using the first participant identifier and/or the second participant identifier, where the identifier is stored relationally to the relevant template. In some embodiments, where a discrepancy exists between a first template related to the first participant identifier and a second template related to a second participant identifier (e.g., when the first participant wants to lend funds at a higher rate than a rate at which the second participant is willing to borrow), the smart contracts service 228 can generate a merged template comprising averaged-out terms values from the first template and the second template.

The predictive analytics service 229 is configured to receive data (e.g., financial data, external data, etc.) and provide a predicted data set based on the received data. The predictive data set may include a prediction of a participant needing a loan.

The machine learning service 230 is configured to work with the predictive analytics service 229 to improve the function of the predictive analytics service 229 as the predictive analytics service 229 acquires more data.

The oracle service 231 is configured to receive external data from external data sources (e.g., the external data source(s) 150 of FIG. 1) and provide the external data to the predictive analytics service 229.

The loan service 232 is configured to generate predictive loan agreements based on the templates and the predicted data. In some embodiments, the predictive loan agreements are utilized by the loan management circuit 313 to generate (actual) loan agreements.

One of skill will appreciate that the executables and/or circuitry for any of the services of the blockchain 210 can, in operation, be coupled to or combined with, the executables and/or circuitry of the participant computing device(s) 201, 202, 203 (e.g., the respective client applications 211, 212, 213), the syndicate computing system 310, and/or the terms template oracle system(s) 390.

Figure 3:
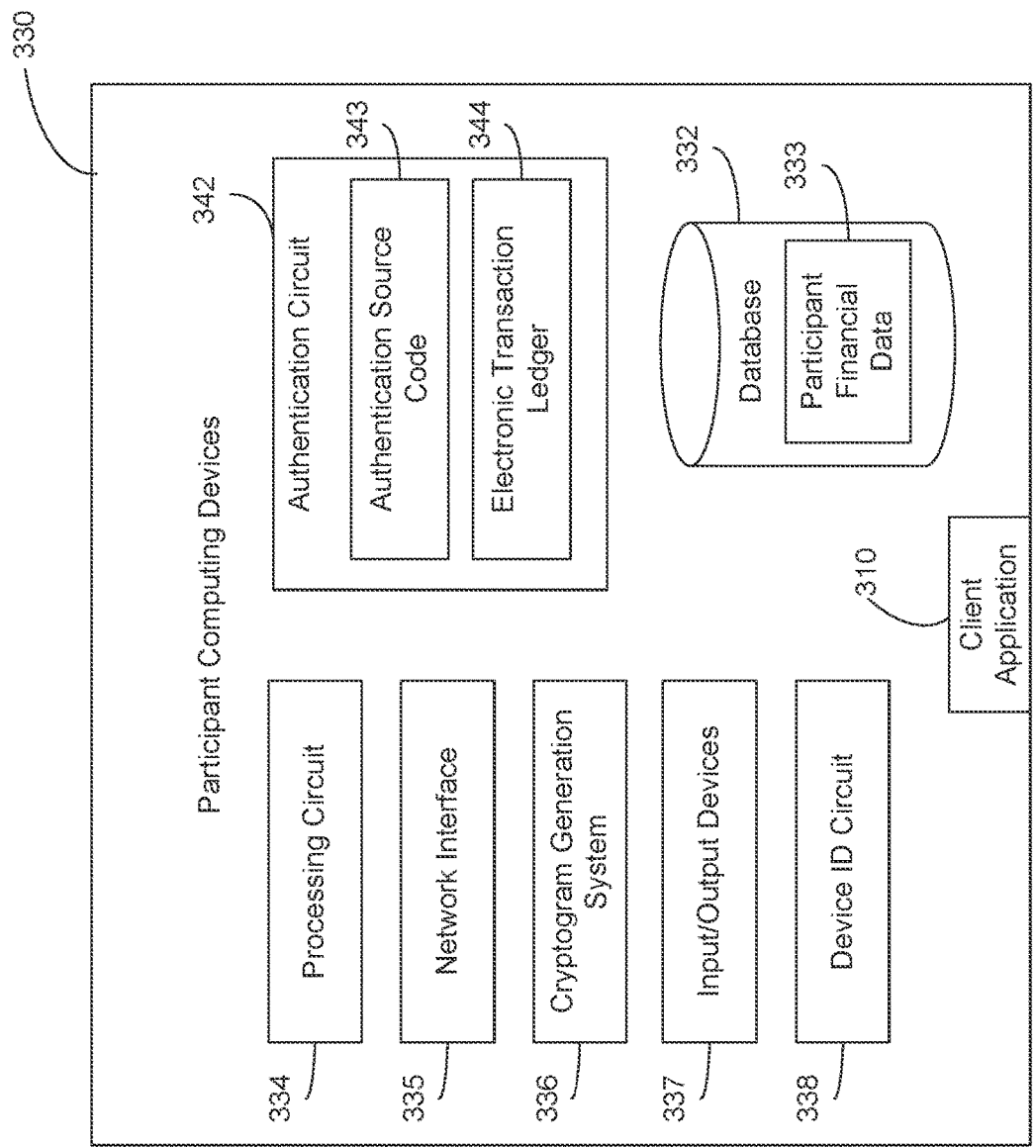
FIG. 3 is a block diagram depicting a participant computing device of the system of FIG. 2, according to some arrangements.

FIG. 3 is a block diagram depicting a participant computing device 330 of the system 100 of FIG. 2, according to some arrangements. The participant computing device 330 of FIG. 3 is the same or substantially similar to the participant computing system(s) 130 of FIG. 1 and/or the participant computing devices 201, 202, 203 of FIG. 2. As shown, the participant computing device 330 includes a processing circuit 334 composed of one or more processors and memory, a network interface 335, a cryptogram generation system 336, input/output devices 337, a device ID circuit 338, an authentication circuit 342, and a database 332. The participant computing device 330 is also configured to access a client application 310 which, in some embodiments, is stored locally on the participant computing device 330. While various circuits, interfaces, and logic with particular functionality are shown, it should be understood that the participant computing device 330 can include any number of circuits, interfaces, and logic for facilitating the functions described herein. For example, the activities of multiple circuits may be combined as a single circuit and implemented on a single processing circuit (e.g., processing circuit 134), as additional circuits with additional functionality are included.

The 332 can include data structures (e.g., datasets) for storing information such as the metadata about transactions (e.g., smart contract execution history), biometric information, distributed ledger node information, or additional information. Further, the data stored in the database 332 may include personal information (e.g., names, addresses, phone numbers, and so on), authentication information (e.g., username/password combinations, device authentication tokens, security question answers, unique client identifiers, biometric data, geographic data, social media data, etc.), and financial information (e.g., token information, account numbers, account balances, available credit, credit history, transaction histories, and so on) relating to the various businesses and/or individuals. The database 332 can be part of the participant computing device 330, or a separate component that the participant computing device 330, and/or other computing devices/systems, can access via a network (e.g., the network 105 of FIGS. 1 and 2). The database 332 can also be distributed throughout the distributed computing system 200 and/or system 100 in FIG. 2. For example, the database 332 can include multiple databases associated with the nodes on the distributed computing system 200, financial institution computing system(s) 140, or both. In some arrangements, each node on the distributed computing system 200 (e.g., 201, 202, 203, 310, etc.) includes a database such that each database contains the same data (e.g., electric transaction ledger data, template data, etc.). In some arrangements, each data structure can be combined into one dataset.

As shown in FIG. 3 the database 332 includes participant financial data 333. According to an example embodiment, the participant financial data 333 includes current and historical financial data (e.g., loans, sales, investments, etc.) associated with a syndicate participant. Accordingly, each of the participants computing devices 330 associated with the syndicate is configured to retrievably store participant financial data 333 associated with syndicate participant in a database 332.

The network interface 335 configured to establish a communication session with a computing device for sending and receiving data over a network (e.g., network 105 and/or the distributed computing system 200 of FIGS. 1 and 2) to/from other computing devices and systems on the network. Accordingly, the network interface 335 includes a cellular transceiver (supporting cellular standards), a global positioning system (GPS) transceiver (supporting GPS standards), a local wireless network transceiver (supporting 802.11X, ZigBee, Bluetooth, Wi-Fi, or the like), a wired network interface, a combination thereof (e.g., both a cellular transceiver, GPS transceiver, and a Bluetooth transceiver), etc. In some arrangements, the participant computing device 330 includes a plurality of network interfaces 335 of different types, allowing for connections to a variety of networks, such as local area networks or wide area networks including the Internet, via different sub-networks.

The cryptogram generation system 336 can be structured to organize and facilitate the generation of cryptograms. That is, the cryptogram generation system 336 may include one or more processing circuits that when executed can generate a cryptogram. In some arrangement, the cryptogram generation system 336 can retrieve data stored in the database 332 that can be utilized to generate the cryptogram. In various arrangement, the cryptogram generation system 336 can retrieve data (e.g., via network 105) stored in the financial institution database 142 that can be utilized to generate the cryptogram. In some arrangements, the database 332 may include a subset of databases such that the cryptogram generation system 336 can analyze each database to determine the appropriate information needed to generate the cryptogram. The cryptogram can be unique to a biometric sample and can be unique for each transaction.

The cryptogram generation system 336 may be configured to execute instructions associated with an algorithm used to generate a cryptogram. In some arrangements, the cryptogram can be a sequence of characters that have been encoded through one or more algorithms to conceal data from unauthorized parties. In other arrangements, the cryptogram is a string of encrypted characters generated by the cryptogram generation system 336 with an encryption key stored in database 332. In some such arrangements, the cryptogram does not include any data identifying syndicate participants but may be decrypted to verify that the cryptogram was generated by cryptogram generation system 336. In some arrangements, the participant computing device 330 can also be structured to decrypt cryptograms to verify the cryptograms were generated by the cryptogram generation system 336 and correspond to an active payment account. In other arrangement, the participant computing device 330 can decrypt the cryptogram and then process the transaction request. In various arrangements, any computing device described herein can be configured to generate a cryptogram (e.g., participant computing devices 201, 202, 203, syndicate computing device 310, financial institution computing system(s) 140, etc.).

The participant computing device 330 can be further configured to receive user input from, and provide information to a user of the participant computing device 330 via the input/output devices 337. For example, the user may be a business administrator associated with the participant computing device 330. In this regard, the participant computing device 330 is structured to exchange data, communications, instructions, etc. via the input/output devices 337. Accordingly, the input/output devices 337 may include any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, a sensor, etc.). One or more input/output devices 337 may be internal to the housing of the participant computing device 330, such as a built-in display, touch screen, microphone, etc., or external to the housing of the participant computing device 330, such as a monitor connected to the participant computing device 330, a speaker connected to the participant computing device 330, etc., according to various arrangements.

The device identification circuit 338 is configured to generate and/or manage a device identifier associated with the participant computing device 330. The device identifier may include any type and form of identification used to distinguish the participant computing device 330 from other computing devices and/or other distributed ledger nodes (e.g. other participant computing devices). In some arrangements, a device identifier may be associated with one or more other device identifiers. In some arrangements, to preserve privacy, the device identifier may be cryptographically generated, encrypted, or otherwise obfuscated by any circuit of the participant computing device 330. In some arrangements, the participant computing device 330 may include the device identifier in any communication that the participant computing device 330 sends to a computing device.

The authentication circuit 342 composed of authentication source code 343 and an electronic transaction ledger 344. The authentication source code 343 may be stored in memory of processing circuit 334, which may be accessed by and/or run on processing circuit 334. The electronic transaction ledger 344 may be stored on the same and/or different processor readable memory, which may be accessible by processing circuit 334 when running the authentication source code 343. In some arrangements, the electronic transaction ledger 344 on a first node (e.g., participant computing device 201 in FIG. 2) of a distributed computing system (e.g., the distributed computing system 200 in FIG. 2) corresponds with the electronic transaction ledger of one or more nodes within the distributed computing system, to the extent that the nodes have synchronized/updated their electronic transaction ledgers (e.g., biometric samples of a plurality of payment accounts). Accordingly, the electronic transaction ledger 344 may be a public ledger. In various arrangements, the authentication circuit 342 may be implemented by a processor of the processing circuit 334. In some arrangements, the electronic transaction ledger 344 can contain all the templates for loan agreements, as described above. Further, the templates may be sorted on the electronic transaction ledger 344 in a plurality of techniques (e.g., by loan parameters, by geographic region, or by other data associated with the syndicate). In some embodiments, the authentication circuit 344 is structured to generate and transmit to the relevant system (e.g., a blockchain, a provider node, another syndicate participant node) an electronic message comprising a device identifier, which can be verified by the receiver as described above prior to engaging in transactions with the device 330.

Figure 4:
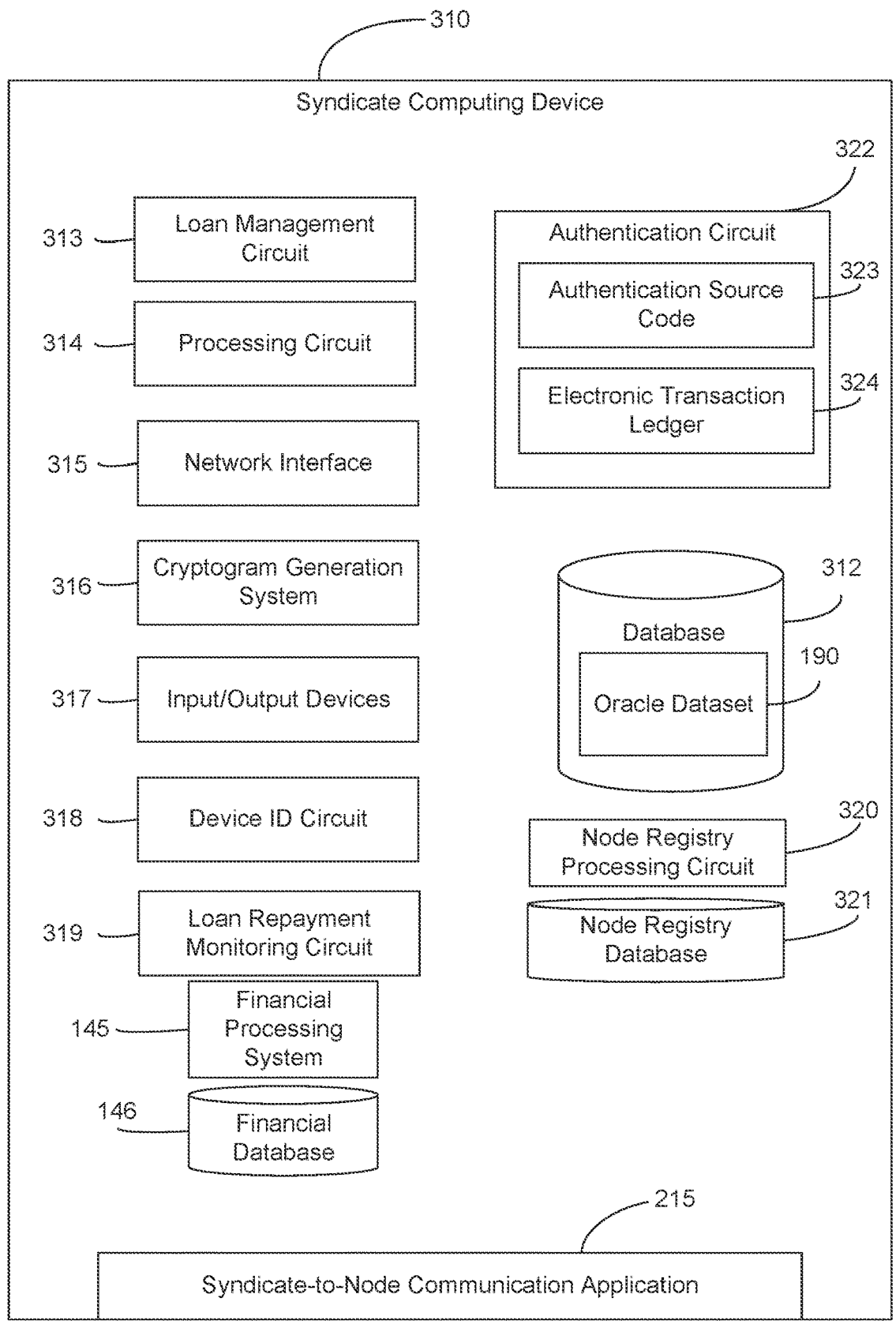
FIG. 4 is a block diagram depicting a syndicate computing device of the system of FIG. 2, according to some arrangements.

FIG. 4 is a block diagram depicting a syndicate computing device 310 of the system 100 of FIG. 2, according to some arrangements. The syndicate computing device 310 is the same or substantially similar to the syndicate computing system(s) 130 in FIG. 1 and/or the syndicate computing device(s) 310 in FIG. 2. The syndicate computing device 310 is shown to include a loan management circuit 313 and a loan repayment monitoring circuit 319, a node registry processing circuit, and a node registry database, as described with respect to FIG. 2. The syndicate computing device 310 is also shown to include a processing circuit 134 having one or more processers and memory and similar to the processing system 311 of FIGS. 1 and 2 and/or the processing circuit 334 of FIG. 3. The syndicate computing system 310 is also configured to access the syndicate-to-node communication application 215 which, in some embodiments, is stored locally on the syndicate computing system 310. Furthermore, the syndicate computing device 310 is shown to include a network interface 315, a cryptogram generation system 316, an input/output device 317, a device ID circuit 318, an authentication circuit 342, an authentication source code 323, the electronic transaction ledger 324, authentication circuit 322, and a database 312. The network interface 315, the cryptogram generation system 316, the input/output device 317, the device ID circuit 318, the authentication circuit 342, the authentication source code 323, the electronic transaction ledger 324, authentication circuit 322, and the database 312 are substantially similar in structure and function to the network interface 335, the cryptogram generation system 336, the input/output device 337, the device ID circuit 338, the authentication circuit 342, the authentication source code 343, the electronic transaction ledger 344, authentication circuit 342, and the database 332 of FIG. 3, respectively.

As shown in FIG. 4, the database 312 includes oracle dataset 190. According to an example embodiment, the oracle dataset 190 includes template data from the terms template oracle system(s) 390 of FIG. 2, external data from the external data source(s) 150 in FIG. 1, and/or financial data from the financial institution computing system(s) 140, the participant computing system(s) 110 and/or participant computing devices 201, 202, 203, 330 in FIGS. 1, 2, and 3. Accordingly, the syndicate computing device 310 is configured to an oracle dataset 190.

In some embodiments and as shown in FIG. 4, the syndicate computing device 310 includes a financial processing system 145 and a financial database 146. The financial processing system 145 is the same or substantially similar in structure and function to the other processing systems and/or circuits (e.g., financial institution processing system 141, participant processing system 131, processing circuit 334, etc.). Similarly, the financial database 146 is the same or substantially similar in structure and function to the other databases (e.g., financial institution database 142, participant database 132, database 312, etc.). In some arrangements, the syndicate computing device 310 may utilize the financial processing system 145 and the financial database 146 similar to the financial institution computing system(s) 140 such that the syndicate computing device is at least partially capable of replacing the financial institution computing system(s) 140. In these arrangements, the syndicate provider is a financial institution.

Figure 5:
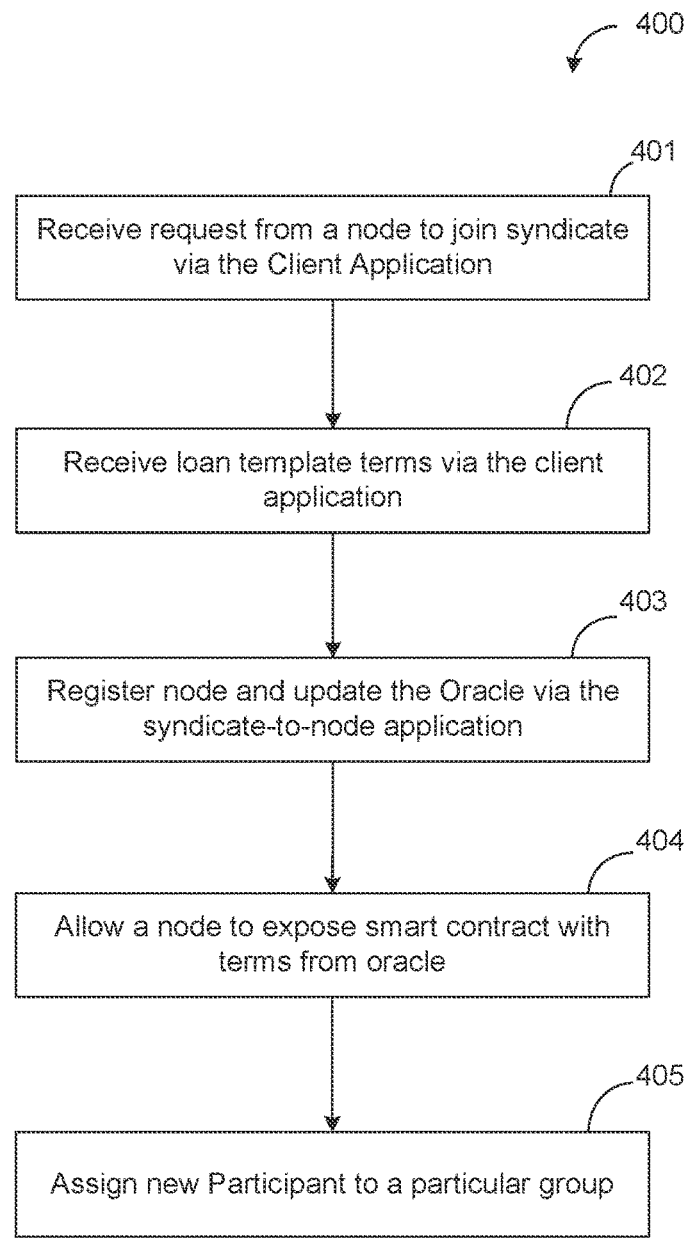
FIG. 5 is a flowchart for a method of registering members to a syndicate, according to some arrangements.

FIG. 5 is a flowchart for a method 400 of registering members to a syndicate, according to some arrangements. The system 100 of FIG. 1 and/or FIG. 2 can be configured to perform method 400. Further, any computing device described herein can be configured to perform method 400. In an example embodiment, the method 400 is performed by the syndicate computing system 110 in FIG. 1 and/or the syndicate computing device 310 in FIG. 2. Additionally, the order of the steps in method 400 may differ from what is depicted in FIG. 5. One or more of the steps may be skipped or omitted. Also, two or more steps may be performed concurrently or with partial concurrence.

In broad overview of method 400, at block 401, a provider computing device (e.g. syndicate computing system 110 in FIG. 1 and/or syndicate computing device 310 in FIG. 2) receives a request from a node (e.g., computing node 251 of in FIG. 1 or participant computing device 201 in FIG. 2) to join the syndicate. At block 402, the syndicate computing device receives a loan terms template via the client application (e.g., client application 211, 212, 213). At block 403, the syndicate computing device registered the node that sent the request and updates the oracle via the syndicate to node application (e.g., syndicate-to-node application 215). At block 404, the syndicate computing device allows a node to expose a smart contract with terms from the oracle. At block 405, the syndicate computing device assigns the new participant to a particular group.

Referring to FIG. 5 in more detail, at block 401, the syndicate computing device receives a request from a computing node to join the syndicate. According to an example embodiment, the computing node is associated with business. In some arrangements, the request includes financial data associated with the business (e.g., financial account balance, credit history, historical operating expenses and revenue, etc.). In some embodiments, the computing node is part of a distributed computing system that is associated with the syndicate computing device, and the request is received by the syndicate computing device via a client application and/or a syndicate-to-node application. In other embodiments, the syndicate computing device receives the request via a network (e.g., network 105).

At block 402, the syndicate computing device receives loan template terms via the client application. The loan template terms include various parameters of loans defined by the computing node. For example, a business associated with the computing node may define a maximum and/or minimum value for various loan parameters such as an amount, a duration, an interest rate, a monthly payment, and the like.

At block 403, the syndicate computing device registers the node as a syndicate participant. The syndicate computing device also updates the oracle computing device with the terms of the loan template. According to an example embodiment, the syndicate computing device access the node computing device and the oracle computing device via a syndicate-to-node application on a distributed computing system.

At block 404, the syndicate computing device allows the node to expose smart contract with the template terms from the oracle. For example, the syndicate computing device allows and/or facilitates the computing node to access template data include loan terms from the oracle. In some arrangements the syndicate computing device utilizes one or more blockchain platform services (e.g., smart contract service, membership service, etc.) to allow the node to be exposed for a smart contract function. The smart contract may receive input parameters from the node (e.g., financial data, template terms, etc.). The smart contract may send the input parameters to the syndicate computing device.

At block 404, the syndicate computing device assigns the new participant (e.g., the node) to a particular group within the syndicate. The syndicate computing device may assign the new participant based on received financial data. For example, the syndicate computing device may assign a new participant to a first group if the new participant requires excess funds. Additionally, the syndicate computing device may assign a new participant to a second group if the new participant has excess funds.

Figure 6:
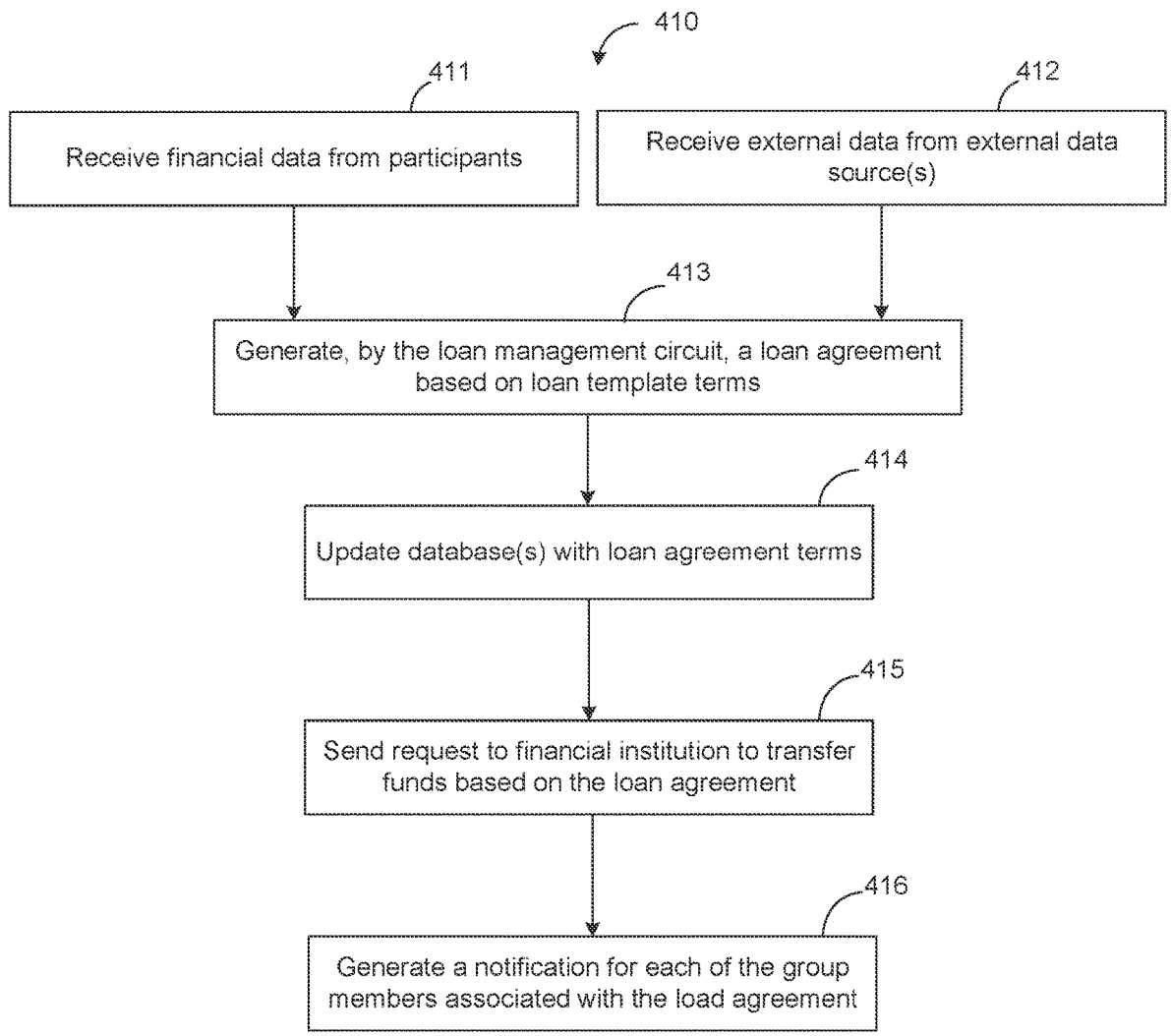
FIG. 6 is a flowchart for a method of providing automatic loan agreements between syndicate participants, according to some arrangements.

FIG. 6 is a flowchart for a method 410 of providing automatic loan agreements between syndicate participants, according to some arrangements. The system 100 of FIG. 1 and/or FIG. 2 can be configured to perform method 410. Further, any computing device described herein can be configured to perform method 410. In an example embodiment, the method 410 is performed by the syndicate computing system 110 in FIG. 1 and/or the syndicate computing device 310 in FIG. 2. Additionally, the order of the steps in method 410 may differ from what is depicted in FIG. 6. One or more of the steps may be skipped or omitted. Also, two or more steps may be performed concurrently or with partial concurrence.

In broad overview of method 410, at block 411, a provider computing device (e.g. syndicate computing system 110 in FIG. 1 and/or syndicate computing device 310 in FIG. 2) receives financial data from syndicate participants (e.g., computing nodes 251, 252, 253, 254 of in FIG. 1 or participant computing devices 201, 202, 203 in FIG. 2). At block 412, the syndicate computing device receives data from an external source (e.g., external data source 150 in FIG. 1). At block 413, the syndicate computing device generates a loan agreement based on the loan template terms. At block 414, the syndicate computing updates the oracle with the loan agreement terms. At block 415, the syndicate computing device sends a request to a financial institution to initiate a funds transfer based on the loan agreement. At block 416, the syndicate computing device generates a notification for each of the syndicate members associated with the loan agreement.

Referring to FIG. 6 in more detail, at block 411, the syndicate computing device receives financial data from each of the syndicate participants. In some embodiments, the financial data is received from one or more financial institutions associated with the syndicate participants.

At block 412, the syndicate computing device receives data from one or more external data sources. The external data sources may include publically available data that was published by a government entity, a news source, research laboratory etc. or privately collected data from a private business. The external data may include seasonal data such as weather patterns, human migration patterns, etc., economic data such as stock market data, supply chain data, macroeconomic data, microeconomic data, etc., and/or disaster related data such as data about a fire, tornado, hurricane, disease outbreak, anthropogenic hazard, etc.

At block 413, a loan management circuit (e.g., the loan management circuit 313 in FIG. 2) of the syndicate computing device generates a loan agreement between one or more members of the first group and one or more members of the second group and based on the financial data and the external data. For example, the loan management circuit may identify that a first participant in the first group was impacted by a disaster and automatically generate a loan agreement based on the loan template terms. Generating the loan agreement may also be based on a predictive analysis of the financial data and the external data performed by the predictive analytics service 229 and/or the machine learning service 230 in FIG. 2. In some embodiments, the loan agreement is generated as a smart contract by the smart contracts service 228 of FIG. 2 and based on the templates previously provided by the relevant participants and retrievably stored in the oracle database 392 of FIG. 2. In some embodiments, the loan management circuit and/or the smart contract service may change the loan terms based on previous economic data and/or previous disaster data. For example, either of these services may invoke the predictive analytics service and identify that a similar disaster caused a business to require a first amount of funds. The predictive analytics service may cause the loan management circuit may generate the loan agreement to include at least the first amount of funds such that the one or more participants in the first group receive sufficient funds.

At block 414, the syndicate computing device updates the relevant databases (e.g., the blockchain database, the oracle terms database, the syndicate database, etc.) with the loan agreement terms.

At block 415, the syndicate computing device sends a request to one or more financial institutions to imitate a funds transfer based on the loan agreement. For example, the syndicate computing device may send a request to one or more financial institutions associated with the one or more participants of the second group to transfer funds from an account of the one or more participants of the second group to an account of the one or more members of the first group.

At block 416, the syndicate computing device generates and/or sends a notification to each of the participants that are party to the loan agreement. The notification may indicate the terms of the loan agreement.

Figure 7:
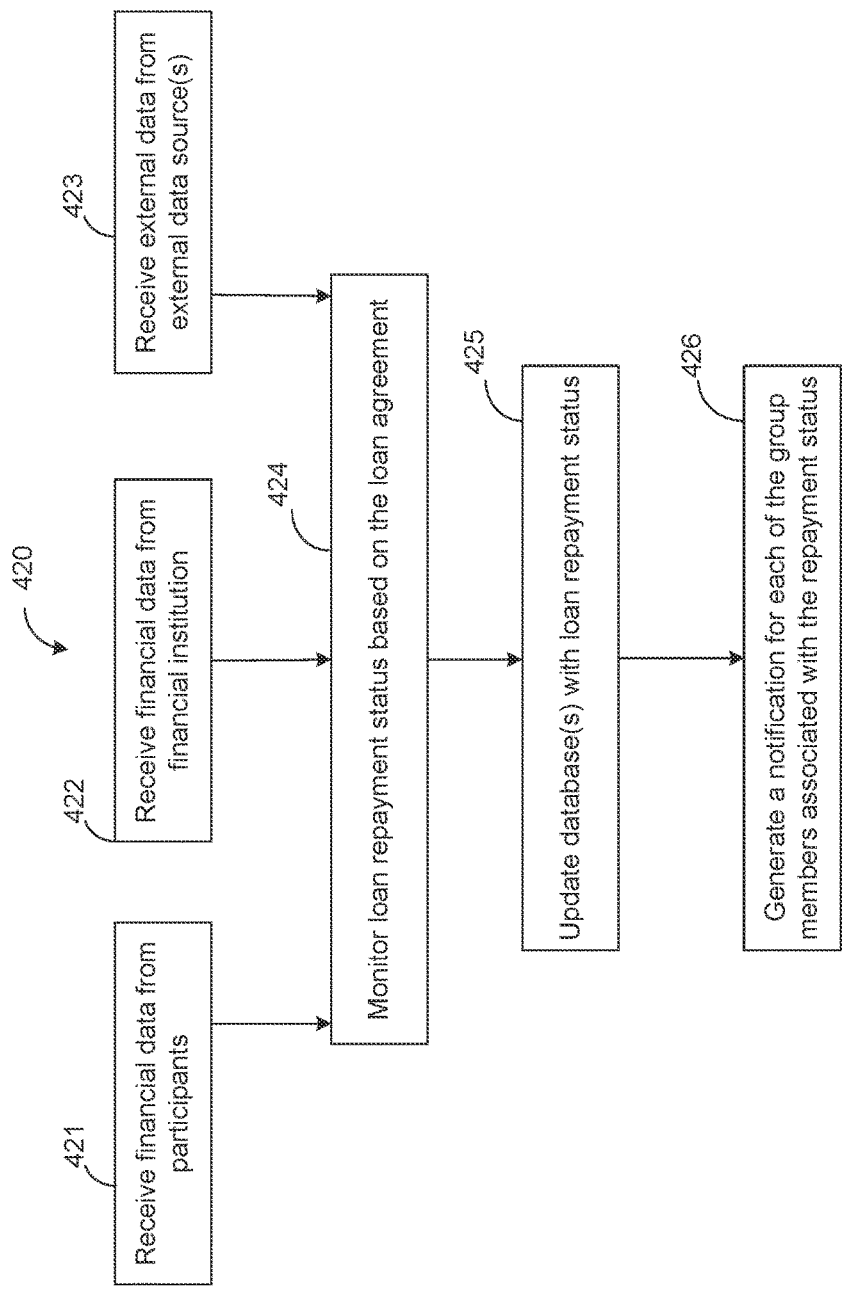
FIG. 7 is a flowchart for a method of monitoring loan repayment status, according to some arrangements.

FIG. 7 is a flowchart for a method 420 of monitoring loan repayment status, according to some arrangements. The system 100 of FIG. 1 and/or FIG. 2 can be configured to perform method 410. Further, any computing device described herein can be configured to perform method 410. In an example embodiment, the method 410 is performed by the syndicate computing system 110 in FIG. 1 and/or the syndicate computing device 310 in FIG. 2. Additionally, the order of the steps in method 420 may differ from what is depicted in FIG. 7. One or more of the steps may be skipped or omitted. Also, two or more steps may be performed concurrently or with partial concurrence.

In broad overview of method 420, at block 421, a provider computing device (e.g. syndicate computing system 110 in FIG. 1 and/or syndicate computing device 310 in FIG. 2) receives financial data from syndicate participants (e.g., computing nodes 251, 252, 253, 254 of in FIG. 1 or participant computing devices 201, 202, 203 in FIG. 2). At block 422, the syndicate computing device receives financial data from a financial institution (e.g., financial institution computing systems 140 in FIG. 1). At block 423, the syndicate computing device receives data from an external source (e.g., external data source 150 in FIG. 1). At block 424, the syndicate computing device monitors loan repayment status based on the loan agreement. At block 425, the syndicate computing updates the oracle with the loan repayment status. At block 426, the syndicate computing device generates a notification for each of the syndicate members associated with the loan agreement.

Referring to FIG. 7 in more detail, at block 421, the syndicate computing device receives financial data from each of the participants associated with the loan agreement. The financial data may include income, expenses, and loan repayment amounts.

At block 422, the syndicate computing device receives financial data from one or more financial institutions associated with participants that are associated with the loan agreement. The financial data may include income, expenses, and loan repayment amounts.

At block 423, the syndicate computing device receives external data from one or more external data sources. The external data may include updated versions of previously received external data and/or new external data.

At block 424, a loan repayment monitoring circuit (e.g., loan repayment monitoring circuit 319 in FIG. 2.) monitors the repayment status of the loan agreement. The repayment status is determined based on one or more of the financial data from the participants, the financial data from the financial institution and the external data from the external data source. For example, the loan agreement may define a monthly payment that depends on the condition of a disaster that impacted the borrowers. That is, the monthly payments may change if the conditions of the disaster changes. Accordingly, the loan repayment monitoring circuit may determine if the borrowers are making complete and timely monthly payments based on the loan agreement.

At block 425, the syndicate computing device updates the relevant databases with the loan repayment status. Updating the databases may include updating syndicate participant member status. For example, participants that make complete and timely monthly payments may have an elevated/better membership status in the syndicate. Similarly, participants that generously provide funds may also have an elevated membership status. Additionally, participants that do not make complete and/or timely monthly payments may have decreased or worse membership status in the syndicate.

At block 426, the syndicate computing device generates and/or sends a notification to each of the participants that are party to the loan agreement. The notification may indicate the repayment status of the loan agreement. Additionally the notification may indicate a participant membership status change.

Figure 8:
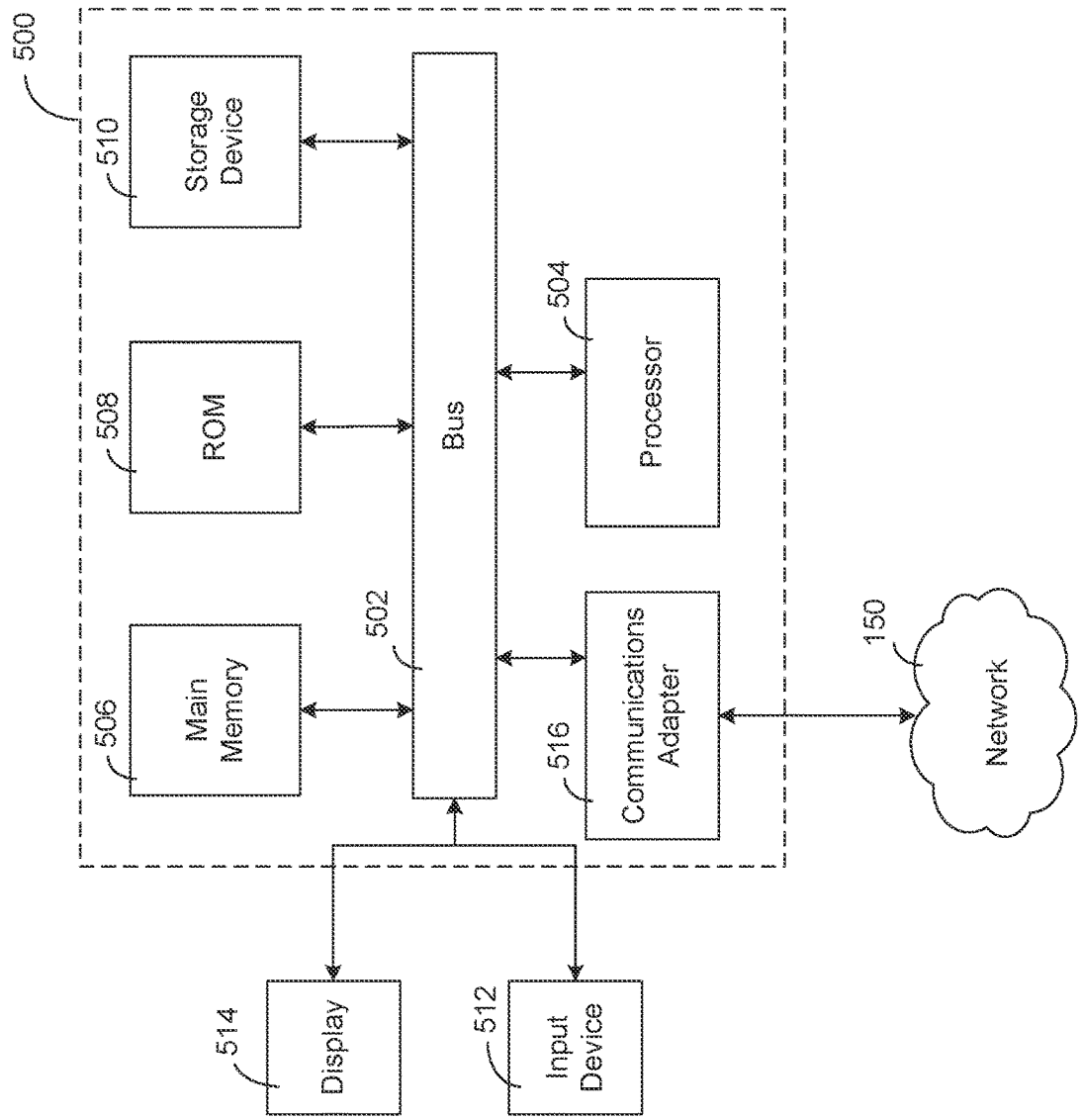
FIG. 8 is a block diagram illustrating an example computing system suitable for use in the various arrangements described herein.

FIG. 8 is a block diagram illustrating an example computing system 500 suitable for use in the various arrangements described herein. In particular, the computer system 500 can be used, for example, to implement an example syndicate computing system/device 110 or 310, an example distributed computing system 200, an example participant computing system/device 130 or 201 etc., and/or various other example devices and systems described in the present disclosure. The computing system 500 includes a bus 505 or other communication component for communicating information and a processor 510 coupled to the bus 505 for processing information. The computing system 500 also includes main memory 515, such as a random access memory (RAM) or other dynamic storage device, coupled to the bus 505 for storing information, and instructions to be executed by the processor 510. Main memory 515 can also be used for storing position information, temporary variables, or other intermediate information during execution of instructions by the processor 510. The computing system 500 may further include a read only memory (ROM) 520 or other static storage device coupled to the bus 505 for storing static information and instructions for the processor 510. A storage device 525, such as a solid state device, magnetic disk or optical disk, is coupled to the bus 505 for persistently storing information and instructions.

The computing system 500 may be coupled via the bus 505 to a display 535, such as a liquid crystal display, or active matrix display, for displaying information to a user. An input device 530, such as a keyboard including alphanumeric and other keys, may be coupled to the bus 505 for communicating information, and command selections to the processor 510. In another arrangement, the input device 530 has a touch screen display 535. The input device 530 can include any type of biometric sensor, a cursor control, such as a mouse, a trackball, or cursor direction keys, for communicating direction information and command selections to the processor 510 and for controlling cursor movement on the display 535.

In some arrangements, the computing system 500 may include a communications adapter 540, such as a networking adapter. Communications adapter 540 may be coupled to bus 505 and may be configured to enable communications with a computing or communications network 105 and/or other computing systems. In various illustrative arrangements, any type of networking configuration may be achieved using communications adapter 540, such as wired (e.g., via Ethernet), wireless (e.g., via WiFi, Bluetooth, etc.), satellite (e.g., via GPS) pre-configured, ad-hoc, LAN, WAN, etc.

According to various arrangements, the processes that effectuate illustrative arrangements that are described herein can be achieved by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes described herein. One or more processors in a multi-processing arrangement may also be employed to execute the instructions contained in main memory 515. In alternative arrangements, hard-wired circuitry may be used in place of or in combination with software instructions to implement illustrative arrangements. Thus, arrangements are not limited to any specific combination of hardware circuitry and software.

That is, although an example processing system has been described in FIG. 5, arrangements of the subject matter and the functional operations described in this specification can be carried out using other types of digital electronic circuitry, or in computer software embodied on a tangible medium, firmware, or hardware, including the structures disclosed in this specification and their structural equivalents, or in combinations of one or more of them. Arrangements of the subject matter described in this specification can be implemented as one or more computer programs, e.g., one or more subsystems of computer program instructions, encoded on one or more computer storage medium for execution by, or to control the operation of, data processing apparatus. Alternatively or in addition, the program instructions can be encoded on an artificially-generated propagated signal, e.g., a machine generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed is:

1. A method comprising:
    forming, by a distributed computing system, a syndicate, the syndicate comprising a plurality of participants;
    generating, by the distributed computing system, a unique identifier for each of the plurality of participants;
    receiving, by the distributed computing system, a verification request comprising the unique identifier from each of the plurality of participants;
    verifying, responsive to receiving the verification request, that a respective entity is a node on the distributed computing system, the node corresponding to one of the plurality of participants;
    receiving, by the distributed computing system, loan terms templates from each of the plurality of participants;
    retrievably storing, by an oracle service associated with the distributed computing system, the loan terms templates;
    receiving, by the distributed computing system, a plurality of data from each of the plurality of participants, the plurality of data comprising one or more of economic data or geo-location data;
    identifying, by the distributed computing system and based on the plurality of data, a first subset of participants of the plurality of participants and a second subset of participants of the plurality of participants, the first subset of participants having an excess of funds, the second subset of participants having a lack of funds;
    verifying, by the distributed computing system, each of the first subset of participants and the second subset of participants;
    automatically executing, by a syndicate computing system and responsive to the identification, at least one loan agreement between at least one of the first subset of participants and at least one of the second subset of participants; and
    enabling, by a consensus service associated with the distributed computing system, a consensus process used to verify data transactions that are recorded by a blockchain such that the consensus service maintains a replicated ledger within the distributed computing system.

2. The method of claim 1, further comprising retrievably storing the at least one executed loan agreement in a blockchain ledger associated with the distributed computing system.

3. The method of claim 1, wherein the plurality of data further comprises one or more of: financial data associated with each of the plurality of participants, macroeconomic data, cyclical financial data, disaster data, or public health data.

4. The method of claim 1, further comprising updating, by the distributed computing system, the first subset of participants and the second subset of participants based on the plurality of data; and
    wherein updating the first subset of participants and the second subset of participants is facilitated by an artificial intelligence (AI) engine, the AI engine structured to analyze one or more of the plurality of data.

5. The method of claim 1, further comprising:
    causing an artificial intelligence (AI) engine to receive historical financial transactions as input; and
    receiving, from the AI engine, one or more spending patterns of one or more of the plurality of participants.

6. The method of claim 1, further comprising generating, by the distributed computing system, at least one template associated with each of the plurality of participants, the template defining one or more parameters of the at least one loan agreement.

7. The method of claim 1, further comprising transferring, by the distributed computing system, funds from the at least one of the first subset of participants to the at least one of the second subset of participants.

8. The method of claim 1, further comprising generating, by the distributed computing system and responsive to automatically executing the at least one loan agreement, a first notification for the at least one of the first subset of participants, the first notification indicating that the at least one loan agreement has been automatically executed.

9. The method of claim 8, further comprising generating, by the distributed computing system and responsive to automatically executing the at least one loan agreement, a second notification for the at least one of the second subset of participants, the second notification indicating that the at least one loan agreement has been automatically executed.

10. The method of claim 1, further comprising:
    facilitating, by the distributed computing system, a repayment service comprising:
        receiving, by the distributed computing system from the oracle service, the loan terms templates from each of the plurality of participants;
        receiving, by the distributed computing system, additional financial data from a financial institution computing system; and
        determining, based on the loan terms templates and the additional financial data, if the one or more of the first subset of participants of the plurality of participants and the one or more of the second subset of the plurality of participants follow the at least one loan agreement.

11. A non-transitory computer-readable storage media having instructions stored thereon that, when executed by at least one processing circuit, cause the at least one processing circuit to:
    register a plurality of syndicate participants to a syndicate;
    generate a unique identifier for each of the plurality of syndicate participants;
    receive financial data associated with the plurality of syndicate participants;
    receive geo-location data associated with the plurality of syndicate participants;
    receive loan terms templates from each of the plurality of syndicate participants;
    retrievably store the loan terms templates;
    identify a first subset of syndicate participants of the plurality of the syndicate participants, the first subset of the syndicate participants having an excess of funds, and a second subset of the syndicate participants of the plurality of the syndicate participants, the second subset of the syndicate participants having a lack of funds;
    generate, responsive to the identification, a loan agreement between one or more of the first subset of the syndicate participants of the plurality of syndicate participants and one or more of the second subset of the plurality of syndicate participants based on one or more of the financial data or the geo-location data;
    execute the loan agreement by transferring funds from the one or more of the first subset of the syndicate participants of the plurality of syndicate participants to the one or more of the second subset of the plurality of syndicate participants; and enable, by a consensus service, a consensus process used to verify data transactions that are recorded by a blockchain such that the consensus service maintains a replicated ledger including the executed loan agreement.

12. The non-transitory computer-readable storage media of claim 11, wherein the media further stores instructions that, when executed by the at least one processing circuit, cause the at least one processing circuit to:
receive additional financial data from a financial institution computing system; and
determine, based on the loan terms templates and the additional financial data if the one or more of the first subset of the syndicate participants of the plurality of syndicate participants and the one or more of the second subset of the plurality of syndicate participants follow the loan agreement.

13. The non-transitory computer-readable storage media of claim 11, wherein the geo-location data associated with the plurality of syndicate participants comprises one or more of seasonal data, disaster data, or public health data.

14. The non-transitory computer-readable storage media of claim 11, wherein the financial data associated with the plurality of syndicate participants comprises one or more of historical financial data, credit reports, or macroeconomic data associated with one or more industries of the plurality of syndicate participants.

15. The non-transitory computer-readable storage media of claim 11, wherein the media further stores instructions that, when executed by the at least one processing circuit, cause the at least one processing circuit to:
update the first subset of the syndicate participants and the second subset of the syndicate participants based on the financial data and the geo-location data; and
wherein updating the first subset of the syndicate participants and the second subset of the syndicate participants is facilitated by an artificial intelligence (AI) engine, the AI engine structured to analyze one or more of the financial data or the geo-location data received from each of the plurality of syndicate participants.

16. The non-transitory computer-readable storage media of claim 11, wherein the media further stores instructions that, when executed by the at least one processing circuit, cause the at least one processing circuit to:
cause an artificial intelligence (AI) engine to receive historical financial transactions as input; and
receive, from the AI engine, one or more spending patterns of one or more of the plurality of syndicate participants.

17. The non-transitory computer-readable storage media of claim 16, wherein the media further stores instructions that, when executed by the at least one processing circuit, cause the at least one processing circuit to:
predict, based on the one or more spending patterns of one or more of the plurality of syndicate participants, that one or more of the plurality of syndicate participants is in need of a loan.

18. A method comprising:
generating, by a distributed computing system, a unique identifier for each of a plurality of participants of a syndicate;
receiving, by the distributed computing system, a verification request comprising the unique identifier from each of the plurality of participants;
verifying, responsive to receiving the verification request, that a respective entity is a node on the distributed computing system, the node corresponding to one of the plurality of participants;
receiving, by the distributed computing system, a plurality of data from each of the plurality of participants, the plurality of data comprising one or more of economic data or geo-location data;
identifying, by the distributed computing system and based on the plurality of data, a first subset of participants of the plurality of participants and a second subset of participants of the plurality of participants, the first subset of participants having an excess of funds, the second subset of participants having a lack of funds;
verifying, by the distributed computing system, each of the first subset of participants and the second subset of participants;
automatically executing, by a syndicate computing system and responsive to the identification, at least one loan agreement between at least one of the first subset of participants and at least one of the second subset of participants; and
enable, by a consensus service associated with the distributed computing system, a consensus process used to verify data transactions that are recorded by a blockchain such that the consensus service maintains a replicated ledger within the distributed computing system.

19. The method of claim 18, further comprising:
causing an artificial intelligence (AI) engine to receive historical financial transactions as input; and
receiving, from the AI engine, one or more spending patterns of one or more of the plurality of participants.

20. The method of claim 19, further comprising predicting, based on the one or more spending patterns of one or more of the plurality of participants, that one or more of the plurality of participants is in need of a loan.

* * * * *